3,271,373
USE OF IONIZED SALTS OF UNSATURATED MONOCARBOXYLIC ACIDS TO PREVENT COAGULATION IN THE EMULSION POLYMERIZATION OF CARBOXYL CONTAINING MONOMERS
Vernon Clare Wolff, Jr., Orange, Tex., assignor to E. I. du Pont de Nemours and Company, Wilmington, Del., a corporation of Delaware
No Drawing. Filed June 22, 1964, Ser. No. 377,082
7 Claims. (Cl. 260—80.5)

This invention relates to an improved process for the emulsion copolymerization of vinyl monomers with carboxyl-substituted monomers.

A valuable class of hydrocarbon copolymers are those containing ethylene and vinyl chloride or acetate. The latexes of such copolymers can be used in paints and as paper coatings and saturants, fabric coatings, non-woven fabric builders, inks, and the like. The isolated copolymer when compounded with clay and cured possess excellent resistance to discoloration and degradation by heat, light and ozone.

It is known to incorporate side-chain carboxyl groups into these copolymers. These groups provide several advantages; they function as cure sites for reaction with reagents such as metal oxides and diamines, they improve the adhesion of the polymer to various substrates such as wood, metal, fibers and the like, and they also improve raw polymer properties because of pseudo cross-links resulting from the association of the carboxyl groups.

A known procedure for incorporating side-chain carboxyl groups into copolymers of ethylene and a copolymerizable vinyl monomer is to emulsion copolymerize these monomers at high pressure in the presence of at least one carboxyl-substituted olefin. Unfortunately, during this process, appreciable amounts of undesired coagulum tend to form with the resultant plugging of reactor and lines. The coagulum-containing latexes are also undesirable for many of the intended uses. It would be highly desirable to substantially eliminate this coagulum formation.

It is, therefore, an object of the present invention to provide an improved process for the emulsion polymerization of certain vinyl monomers with a carboxyl-substituted monomer. Another object of this invention is to obtain the copolymerization product of these monomers in a latex form having reduced amounts of coagulum. Other objects will appear hereinafter.

It has been discovered that in the process of preparing copolymers of ethylene, a vinyl monomer such as vinyl chloride or vinyl acetate, and at least one monocarboxyl substituted monoolefin by free radical catalyzed aqueous emulsion copolymerization at superatmospheric pressure, the formation of coagulum in the resultant copolymer latex is minimized or eliminated by carrying out the copolymerization in the presence of an ionized salt of the monocarboxyl-substituted monoolefin. The amount of said salt is that which reduces the formation of coagulum to the level desired. Generally, satisfactory results are obtained when from about 5 to about 70% of the carboxyl groups (i.e. supplied by the monocarboxyl substituted monoolefin) are present in the copolymerization system as the ionized salt.

The present invention provides a marked degree of improvement. For example, in a series of continuous polymerizations (described more particularly in the examples which follow) where ethylene/vinyl chloride/acrylic acid copolymers were prepared continuously at about 100° C. and 22,000 lbs./sq. in. pressure, large quantities of coagulum were produced and severe fouling of the reactor occurred when none of the acrylic acid monomer was neutralized whereas partial neutralization of the acrylic acid resulted in a 20–30 fold decrease in coagulum and the consequent formation of better latexes. This effect was noted over the range of the acrylic acid being present from 5 to 70% as ionized salt by neutralization of varying amounts of the acid. Accordingly, the polymerization system remains acidic. The best results were obtained when about 25% of the acrylic acid was neutralized.

In general, about 5 to 70 of every 100 carboxyl groups present in the reaction mixture should be in the form of an ionized salt. When more carboxyl groups are free, some benefit is obtained but it may not be significant enough to be entirely satisfactory. When more than 70% of the carboxyl groups present are in ionic form, the copolymerization may be interfered with; for example, complete neutralization may render the carboxyl substituted monomer inoperable, i.e., it will not copolymerize. Those skilled in the art can readily determine by routine experiments the optimum amount of ionized salt needed for a particular system.

The process of the present invention is carried out merely by introducing the sufficient quantity of a salt of the carboxyl-substituted monomer during the emulsion copolymerization. In order to gain the beneficial effect, the minimum amount of salt should be present from the beginning of the reaction period. Alternatively, sufficient base (e.g. alkali metal hydroxide, ammonia, or an amine) is introduced during the emulsion copolymerization to make the salt in situ. The alkali metal hydroxide can be any of the common reagents such as sodium hydroxide or potassium hydroxide or mixtures thereof. Although base can be added entirely at the start or intermittently or continually during the copolymerization, there should be enough present at the start to neutralize at least 5% of the carboxyl groups then present in the reaction mixture. Thus, by way of illustration, if the minimum amount of sodium hydroxide is supplied at the start and further carboxyl-containing monomer is subsequently introduced, more sodium hydroxide will have to be added to neutralize the minimum of 5%. It is to be understood that if more than 70% of the carboxyl groups are ionic at a particular stage in the reaction, the present invention can still be carried out by the subsequent addition of additional carboxyl-containing monomer to bring the amount of free carboxyl groups below the 70% maximum.

The present invention is broadly useful in polymerizations carried out in aqueous emulsion using the conventional free radical catalyst and modifying agents, if desired. Conventional emulsifiers are also used. In general, the monomers supplied will include ethylene, at least one monocarboxyl substituted monoolefin, which need not contain more than four carbon atoms, and one or more additional copolymerizable vinyl monomers. Representative copolymers made with the present invention include ethylene/vinyl chloride/acrylic acid; ethylene/vinyl acetate/methacrylic acid; and ethylene/vinyl acetate/acrylic acid. The composition of these copolymers can be varied to obtain the copolymer properties desired. Generally, but not necessarily, the ethylene and carboxyl substituted monoolefin constitute at least 25% by weight of the copolymer. The carboxyl-substituted monomer can comprise up to about 10% by weight of the copolymer. Representative copolymers of ethylene/vinyl chloride/acrylic acid contain 51.7–54.6 weight percent of vinyl chloride and 2.4–6.9 weight percent acrylic acid with the balance being ethylene. Other suitable copolymers are described in U.S. Patents Nos. 2,396,677, 2,497,291, 2,422,392, 2,985,633, and British Patent 641,679. Monomer conversions can be adjusted to those skilled in the art; representative ethylene/vinyl chloride/acrylic acid conversions have ranged from 30 to 60% and the latexes have had up to 45% solids. In general, superatmospheric pressure is employed; representative values range from at least about 500 atmospheres to about 3000 atmospheres. The maximum value will be governed by the nature of the equipment employed. The temperature is not critical; for ethylene/vinyl chloride/acrylic acid terpolymers values in the neighborhood of 100° C. have been used. Discussions of emulsion polymerization technique useful for carrying out the present invention are given in the book, High Polymers IX, Emulsion Polymerization, F. A. Bovey, I. M. Kolthoff, A. I. Medalia and E. J. Meehan, Inter-science Publishers, Inc., New York, 1955.

The following examples are illustrative of the present invention, and accordingly, this invention is not limited to these examples. Parts and percents are by weight unless otherwise noted.

GENERAL PROCEDURE FOR EXAMPLES 1 AND 2

Polymerizations were carried out in a continuous unit consisting of a stirred, stainless steel autoclave (free volume, 287 cc.) containing four inlet pipes in the bottom and one exit pipe in the top. Agitation rate was 680 r.p.m. Five separate feed streams were pumped, but two of them, ethylene and vinyl chloride, were mixed before entering the autoclave. Pressure was controlled by an automatic valve on the exit line. The desired temperature was obtained by circulating hot water or steam through a jacket on the autoclave.

In the examples summarized in the following tables, the aqueous solutions were prepared and thoroughly purged with $N_2$ to remove dissolved $O_2$. The polymerizations were carried out continuously under the conditions indicated. In all cases where none of the acrylic acid monomer was neutralized, large quantities of coagulum were produced and severe fouling of the reactor resulted. Partial neutralization of the acrylic acid resulted in the formation of better latexes with less coagulum and less fouling of the reactor. This effect was noted over the range of 10–50% neutralization of the acrylic acid. Best results were obtained when 25% of the acrylic acid was neutralized.

*Example 1*

|  | Control | Present Invention |
|---|---|---|
| Autoclave: |  |  |
| Pressure, p.s.i. | 22,000 | 22,000 |
| Temperature,° C | 96–99 | 94–102 |
| Flow Rates, g./min.: |  |  |
| Ethylene | 2.81 | 2.81 |
| Vinyl chloride | 3.10 | 3.15 |
| Solution No. 1 [1] (contg. acrylic acid) | 1.7 |  |
| Solution No. 2 [1] (contg. acrylic acid plus NaOH) |  | 1.6–2.0 |
| Catalyst: |  |  |
| Solution No. 3 [1] | 1.0 | 0.9–1.0 |
| Solution No. 4 [1] | 2.2 | 1.5–1.8 |
| Latex Product: |  |  |
| Wt., g./hr. | 242 | 320–423 |
| Coagulum, g./hr. | [2] (about 80) | 1.91–3.11 |
| Percent solids |  | 51.3–54.5 |
| pH | 2.1 | 2.8–4.1 |
| Polymers: |  |  |
| Percent Cl | 35.9 | 34.5–36.3 |
| Percent COOH | 1.4 | 1.2–2.7 |

[1] See the following table:

| Solution No | 1 | 2 | 3 | 4 |
|---|---|---|---|---|
| Glacial acrylic acid, g | 13.72 | 13.72 |  |  |
| NaOH, 0.33 N, g |  | 57.68 |  |  |
| Duponol ME (sodium lauryl sulfate, 93% A.I.), g | 3.01 | 3.01 |  | 2.66 |
| Sodium formaldehyde sulfoxylate dihydrate, g |  |  |  | 0.365 |
| $FeSO_4 \cdot 7H_2O$, g |  |  |  | 0.0088 |
| Distilled $H_2O$, g | 100.00 | 42.32 | 99.61 | 100.00 |
| $H_2O_2$, g |  |  | 0.394 |  |

[2] Approximately ⅓ of the polymer was coagulated.

*Example 2*

|  | A | B | C |
|---|---|---|---|
| Autoclave: |  |  |  |
| Pressure, p.s.i. | 22,000 | 22,000 | 22,000 |
| Temperature,° C | 69–70 | 69–71 | 70–71 |
| Flow Rates, g./min.: |  |  |  |
| Ethylene | 1.9–2.2 | 2.0–2.4 | 2.2–2.8 |
| Vinyl chloride | 1.1–1.2 | 1.2–1.4 | 1.2–1.7 |
| Solution No. 1* (contg. acrylic acid plus NaOH) | 4.6–5.0 |  |  |
| Solution No. 2* (contg. acrylic acid plus NaOH) |  | 4.7–5.7 |  |
| Solution No. 3* (contg. acrylic acid plus NaOH) |  |  | 5.0–6.5 |
| Catalyst: |  |  |  |
| Solution No. 4 [1] | 4.5–4.7 | 5.0–5.4 | 5.0–6.5 |
| Solution No. 5 [1] | 4.5–4.7 | 4.2–5.9 | 4.7–6.2 |
| Latex Product: |  |  |  |
| Wt., g./hr. | 855–965 | 890–1183 | 901–1200 |
| Coagulum, g./hr. | 0.03–1.34 | 0.02–0.07 | 0.01–0.49 |
| Percent Solids | 11.8–13.2 | 10.8–13.2 | 11.0–13.6 |
| pH | 3.1–3.9 | 4.5–5.1 | 5.3–5.8 |
| Polymer: |  |  |  |
| Percent Cl | 21.6 | 23.5 | 21.6 |
| Percent COOH | 4.5 | 4.4 | 3.1 |

[1] See the following table:

| Solution No | 1 | 2 | 3 | 4 | 5 |
|---|---|---|---|---|---|
| Glacial acrylic acid, g | 3.65 | 3.65 | 3.65 |  |  |
| NaOH, 0.3041 N, ml |  | 41.68 | 83.35 |  |  |
| NaOH, 0.3334 N, ml | 15.20 |  |  |  |  |
| Duponol Me (sodium lauryl sulfate, 93% A.I.), g |  |  |  |  | 1.46 |
| Sodium formaldehyde sulfoxylate dihydrate, g |  |  |  |  | 0.73 |
| $FeSO_4 \cdot 7H_2O$, g |  |  |  |  | 0.0017 |
| Distilled $H_2O$, g | 81.15 | 54.67 | 13.00 | 99.70 | 97.81 |
| $H_2O_2$, g |  |  |  | 0.30 |  |
| Fraction of acrylic acid Neutralized | 0.10 | 0.25 | 0.50 |  |  |

*Example 3*

A. *General procedure.*—A jacketed 2-liter autoclave capable of operating at pressures up to 2000 atmospheres was equipped with an agitator operating at 750 r.p.m. and 4 inlet ports for reactant addition. Reactant flow was normally upward through the reactor.

The ethylene was compressed to the desired operating pressure and admixed with the comonomers prior to entering the autoclave. The initiator was dissolved in water and delivered directly to the reaction under pressure. A third process stream was used for the activator. The remaining reactor inlet port was used for the surfactant addition. Normally the surfactants were dissolved in water at a concentration such that the resulting dispersion contained about 5 weight percent surfactant based on solids.

All streams were delivered to the unit before the initiator was added to the reactor. The heat of reaction was partially removed by circulating water or a heat transfer medium through the jacket surrounding the autoclave after the reaction was begun. The product dispersion was let-down through a "Wee-Willie" Annin valve to atmospheric pressure. Off-gas was vented.

B. *Preparation of ethylene/vinyl acetate/methacrylic acid copolymer.*—Three continuous runs were made.

The total feed supplied had the following composition:

| Run | Feed in Pounds per Hour | | |
|---|---|---|---|
|  | A | B | C |
| Ethylene | 5.0 | 5.0 | 5.0 |
| Vinyl Acetate | 2.17 | 2.17 | 2.11 |
| Methacrylic Acid | 0.23 | 0.43 | 0.59 |
| Hydrogen Peroxide (catalyst) [1] | 0.0146 | 0.0194 | 0.0206 |
| Water | 8.43 | 7.99 | 8.2 |
| Zinc Formaldehyde Sulfoxylate (activator) | 0.0271 | 0.033 | 0.035 |
| Sodium Methacrylate | 0.036 | 0.035 | 0.034 |
| "Natrosol" (surfactant) [2] | 0.182 | 0.171 | 0.171 |

[1] Active ingredient; used as a 30% aqueous solution.
[2] Active ingredient; used as a 5% solution. "Natrosol" is a non-ionic water-soluble cellulose ether.

The reaction conditions maintained were as follows:

| Run | A | B | C |
|---|---|---|---|
| Operating Pressure, atms | 1,400 | 1,400 | 1,400 |
| Residence Time, min | 12.2 | 12.2 | 12.4 |
| Operating Temperature, °C | 151 | 138 | 131 |
| Total Monomer in Reactor, percent | 46.0 | 48.0 | 47.8 |
| Percent Methacrylic acid in Na Salt Form | 13.6 | 7.5 | 5.5 |
| Percent Conversion (total) | 57.6 | 58.2 | 51.3 |

The latexes produced were stable and had the following characteristics:

| Run | A | B | C |
|---|---|---|---|
| pH (25° C) | 3.7 | 3.4 | 3.6 |
| Percent total Solids | 35.8 | 38.0 | 34.8 |
| Copolymer Composition, Weight percent: | | | |
| Ethylene | 71.3 | 65.7 | 61.5 |
| Vinyl Acetate | 24.5 | 27.4 | 28.3 |
| Methacrylic Acid | 4.2 | 6.9 | 10.5 |

As many widely different embodiments of this invention may be made without departing from the spirit and scope thereof, it is to be understood that this invention is not limited to the specific embodiments thereof except as defined in the appended claims.

What is claimed is:

1. In the process of preparing copolymers of ethylene, a monomer selected from the group consisting of vinyl chloride and vinyl acetate, and at least one monocarboxyl substituted monoolefin by free radical catalyzed aqueous emulsion copolymerization at superatmospheric pressure, the improvement comprising carrying out the copolymerization in the presence of coagulum reducing amount of an ionized salt of said monocarboxyl substituted monoolefin.

2. In the process as recited in claim 1 wherein from about 5 to about 70% of the carboxyl groups in the copolymerization system are present as said ionized salt.

3. In the process as recited in claim 1 wherein said monocarboxyl substituted monoolefin is acrylic acid.

4. In the process of preparing copolymers of ethylene, a monomer selected from the group consisting of vinyl chloride and vinyl acetate, and at least one monocarboxyl substituted monoolefin by free radical catalyzed aqueous emulsion copolymerization at superatmospheric pressure, the improvement comprising carrying out the copolymerization in the presence of sufficient alkali metal hydroxide to neutralize from about 5 to about 70% of the carboxyl groups present in the copolymerization system.

5. In the process as recited in claim 4 wherein said alkali metal hydroxide is sodium hydroxide.

6. In the process as recited in claim 4 wherein sufficient said alkali metal hydroxide is present to neutralize about 25% of the carboxyl groups present in the copolymerization system.

7. In the process of preparing copolymers of ethylene, a monomer selected from the group consisting of vinyl chloride and vinyl acetate, and at least one monocarboxyl substituted monoolefin by free radical catalyzed aqueous emulsion copolymerization at superatmospheric pressure, the improvement comprising carrying out the copolymerization in the presence of sufficient base to neutralize from about 5 to about 70% of the carboxyl groups present in the copolymerization system.

No references cited.

JOSEPH L. SCHOFER, *Primary Examiner.*

WAYNE HOOVER, *Assistant Examiner.*